(12) United States Patent
Taki

(10) Patent No.: US 9,319,561 B2
(45) Date of Patent: Apr. 19, 2016

(54) IMAGE READING APPARATUS, CONTROL METHOD THEREOF, AND RECORDING MEDIUM

(75) Inventor: Hideo Taki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 897 days.

(21) Appl. No.: 13/316,274

(22) Filed: Dec. 9, 2011

(65) Prior Publication Data

US 2012/0147439 A1 Jun. 14, 2012

(30) Foreign Application Priority Data

Dec. 10, 2010 (JP) ................................ 2010-275494

(51) Int. Cl.
| | |
|---|---|
| H04N 1/04 | (2006.01) |
| H04N 1/407 | (2006.01) |
| H04N 1/00 | (2006.01) |
| H04N 1/10 | (2006.01) |
| H04N 1/193 | (2006.01) |

(52) U.S. Cl.
CPC ......... *H04N 1/4076* (2013.01); *H04N 1/00925* (2013.01); *H04N 1/1017* (2013.01); *H04N 1/193* (2013.01); *H04N 2201/0081* (2013.01)

(58) Field of Classification Search
CPC ... H04N 1/193; H04N 1/1017; H04N 1/1013; H04N 2201/1016; H04N 2201/0425

USPC ......... 358/497, 494, 474, 496, 408, 486, 483, 358/482, 461, 471, 413; 250/234–236, 250/208.1, 239, 216; 318/696, 683; 382/274

See application file for complete search history.

(56) References Cited

U.S. PATENT DOCUMENTS

| | | | |
|---|---|---|---|
| 6,330,084 B1 * | 12/2001 | Chiang | 358/497 |
| 6,717,702 B1 | 4/2004 | Yamauchi et al. | |
| 8,508,807 B2 * | 8/2013 | Tanaka et al. | 358/461 |

FOREIGN PATENT DOCUMENTS

| | | | | |
|---|---|---|---|---|
| JP | 61013213 A | * | 1/1986 | |
| JP | 08-079472 A | | 3/1996 | |
| JP | 2001-077983 A | | 3/2001 | |
| JP | 2002185710 A | * | 6/2002 | |
| JP | 2006-243566 A | | 9/2006 | |
| JP | 2010-056732 A | | 3/2010 | |

\* cited by examiner

*Primary Examiner* — Cheukfan Lee
(74) *Attorney, Agent, or Firm* — Kilpatrick Townsend & Stockton LLP (57) ABSTRACT

A scanner unit includes, a CIS module having a light source unit, and a CIS which receives reflected light which is emitted in the light source unit; a carriage motor which is provided in the vicinity of the CIS module, and operates along with heat when reading out using the CIS module; a determination unit which determines whether or not dark period measurement data read out using the CIS module in a dark period is in a predetermined range of a reference dark period which is set corresponding to a temperature of the carriage motor; and a control unit which controls the carriage motor so as to limits an operation of the carriage motor in read processing, when the dark period measurement data is not in the range of the reference dark period.

9 Claims, 4 Drawing Sheets

IMAGE READING APPARATUS, CONTROL METHOD THEREOF, AND RECORDING MEDIUM

CROSS REFERENCES TO RELATED APPLICATIONS

The entire disclosure of Japanese Patent Application No. 2010-275494, filed Dec. 10, 2010 is expressly incorporated by reference herein.

BACKGROUND

1. Technical Field

The present invention relates to an image reading apparatus, a control method and program thereof.

2. Related Art

In the related art, as an image reading apparatus of this type, an apparatus is proposed in which a positional deviation of a lens unit with respect to a photoelectric conversion unit is detected, when the positional deviation occurs due to a difference in thermal expansion between the lens unit and the photoelectric conversion unit, correction data is selected among plural pieces of correction data which are stored in advance, on the basis of the detected deviation, and an electric signal is corrected based on the corrected data (JP-A-2010-56732). In this apparatus, the influence due to changes in temperature is reduced, the reading quality of the original document is improved, or the like, by favorably correcting unevenness of stripe shapes in the main scanning direction.

In the above described apparatus, it was possible to reduce the influence due to the change in the temperature, however, in the higher temperature, it was difficult to sufficiently reduce the influence due to the change in the temperature through correction alone. Therefore, when the temperature becomes high at the time of reading an image, limiting the operation by providing a periodic cooling time, or the like, may be considered. However, in such a manner, it is necessary to have the margin for the time and interval for the operation limitation, therefore, the time for reading the original document becomes longer.

SUMMARY

An advantage of some aspects of the invention is to provide an image reading apparatus, a control method and a program thereof which can appropriately limit the operation.

The image reading apparatus, a control method and a program thereof according to some aspects of the invention adopts the following in order to achieve the above described advantage.

According to an aspect of the invention, there is provided an image reading apparatus including: a reading unit which reads out an original document, and includes a light emitting unit which emits light to the original document, and a light receiving unit which has a light receiving element that receives reflected light of the light which is reflected on the original document; an operation unit which is provided in the vicinity of the reading unit, and operates by being heated when reading the original document using the reading unit; a determination unit which determines whether or not dark period measurement data, which is read out using the reading unit in the dark period, is in a predetermined range of a reference dark period which is set corresponding to a temperature of the operation unit; and a control unit which controls the reading unit and the operation unit so that read processing which reads out the original document is to be performed when the dark period measurement data is in the range of the reference dark period, and limits the operation of the operation unit in comparison to the read processing when the dark period measurement data is not in the range of the reference dark period.

In the image reading apparatus, the read processing of the original document is performed when the dark period measurement data is in the range of the reference dark period, and the operation is limited in comparison to the read processing of the original document when the dark period measurement data is not in the range of the reference dark period. Here, when the temperature of the operation unit is high, in some cases, the dark period measurement data which is read data of the dark period moves to a white side due to the influence of heat on the reading unit. By using such a property, this apparatus performs the read processing of the original document by determining that the temperature of the operation unit is not high when the dark period measurement data is in the range of the reference dark period, and limits the operation of the operation unit of reading the original document by determining that the temperature of the operation unit is high when the dark period measurement data is not in the range of the reference dark period. In this manner, it is possible to appropriately limit the operation, since the dark period measurement data is obtained by reading the image, and the control is performed according to the temperature of the operation unit which is assumed on the basis of the dark period measurement data. In addition, the vicinity means that the operation unit is in the vicinity of the reading unit so that the reading unit is influenced by the heat of the operation unit, and it includes a case where the operation unit does not come into contact with the reading unit, not only the case where the operation unit comes into contact with the reading unit. Further, the light receiving element is supposed to receive the reflected light which is emitted from the light emitting unit and is reflected on the original document, however, the original document referred to here may include a reading target such as a white reference plate. That is, it may be one that receives reflected light which is emitted from the light emitting unit.

In the apparatus, the operation unit may be a driving unit which is driven when moving the original document and the reading unit relatively. In this manner, it is possible to further appropriately limit the operation of the driving unit which is an operation unit of which calorific value become large easily. In addition, the operation unit may be a driving unit which is fixed to the reading unit which reads out the original document while moving, and moves along with the reading unit. In this manner, it is possible to further appropriately limit the operation of the driving unit of which the calorific value easily becomes large, and which moves itself, since miniaturization and higher output are realized.

In the apparatus, the determination unit may be a unit which determines whether or not the dark period measurement data in the range in which the operation unit is provided is in a predetermined range of the reference dark period. In this manner, it is possible to reduce the information amount which is used in determination, and to perform determination effectively.

In the apparatus, the determination unit may repeat the reading out of the dark period measurement data using the reading unit, and the determination of whether or not the dark period measurement data is in the predetermined range of the reference dark period. The control unit may be the unit which limits the operation of the operation unit until the dark period measurement data is in the range of the reference dark period. In this manner, it is possible to further appropriately perform the operation limitation. In addition, the control unit may be the unit which limits the operation of the operation unit until a predetermined cooling time passes. In this manner, it is possible to suppress the number of times of the read processing and determination processing of the dark period measurement data, and to effectively limit the operation of the operation unit.

According to another aspect of the invention, there is provided a control method of an image reading apparatus including: a reading unit which reads out the original document, and includes a light emitting unit which emits light to the original document, and a light receiving unit which has a light receiving element that receives reflected light of the light which is reflected on the original document; and an operation unit which is provided in the vicinity of the reading unit, and operates by being heated when reading the original document using the reading unit, wherein the method includes, (a) determining whether or not dark period measurement data which is read out using a reading unit in a dark period is in the range of a predetermined reference dark period which is determined corresponding to a temperature of the operation unit, (b) controlling the reading unit and the operation unit so that read processing which reads out the original document is to be performed when the dark period measurement data is in the range of the reference dark period, and limiting the operation of the operation unit in comparison to the read processing when the dark period measurement data is not in the range of the reference dark period.

In this control method, when the dark period measurement data is in the range of the reference dark period, it is assumed that a temperature of the operation unit is not high, and the read processing of the original document is performed, and when the dark period measurement data is not in the range of the reference dark period, it is assumed that a temperature of the operation unit is high, and the operation of the operation unit is further limited compared to the read processing of the original document. In this manner, it is possible to further appropriately limit the operation, since the dark period measurement data is read out using the reading unit which reads out the original document, and performs the control according to the temperature of the operation unit which is assumed from the dark period measurement data. In addition, in this control method, the above described various aspects of the image reading apparatus may be adopted, and another process which is able to realize each function of the above described image reading apparatus may be added.

According to still another aspect of the invention, there is provided a recording medium which records a program which realizes each processing of the above described control method on one or more computers. The program may be recorded in a computer readable recording medium (for example, a hard-disk, a ROM, an FD, a CD, a DVD, or the like), may be delivered to a separate computer from the computer through a transmission medium (a communication network such as the Internet, or a LAN), and may be transmitted and received through the other transmission types. If the program is executed by one computer, or is executed by dividing each process across plural computers, it is possible to obtain the same operation effect as that of the control method, since each process of the above described control method is executed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
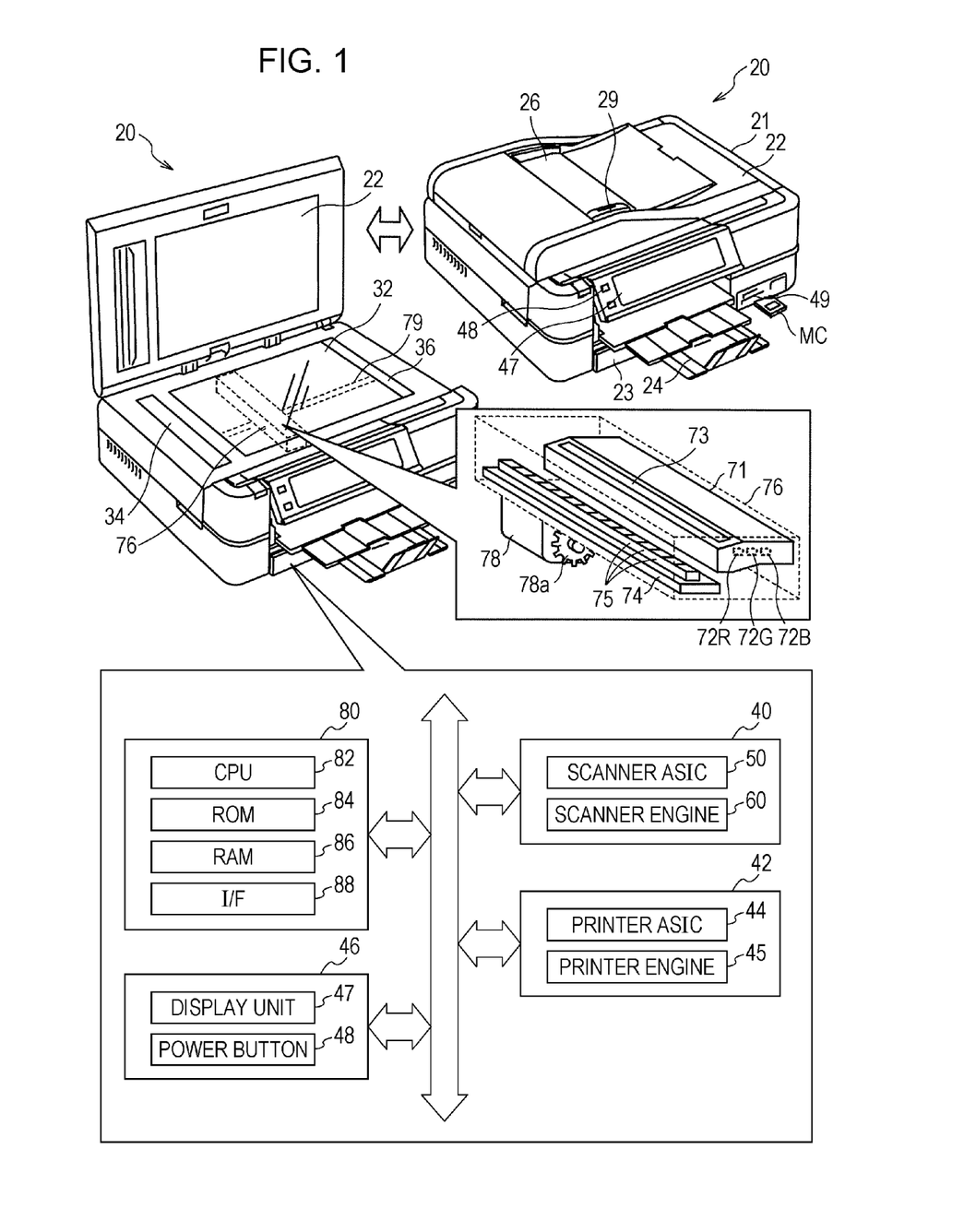
FIG. 1 is a configuration diagram which shows a schematic configuration of a multi-function printer.
Figure 2:
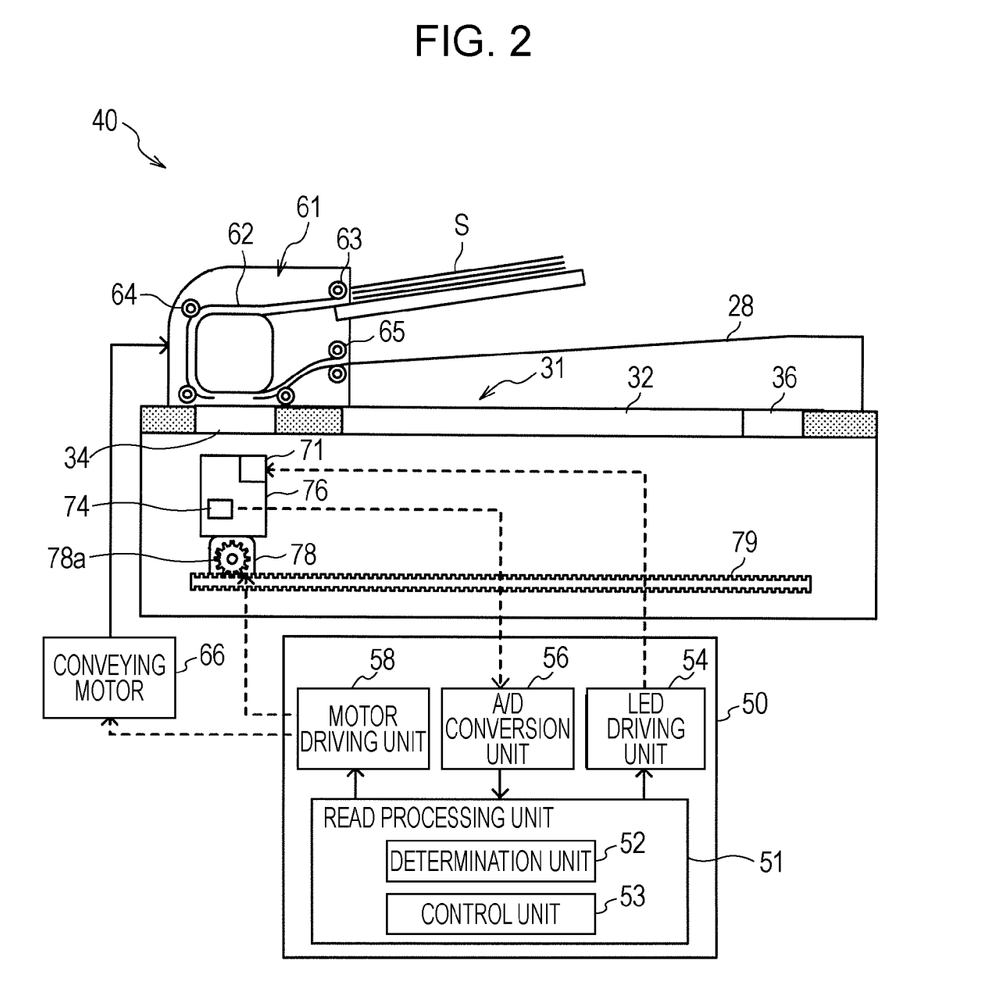
FIG. 2 is a configuration diagram which shows a schematic configuration of a scanner unit.

Subsequently, embodiments of the invention will be described with reference to drawings. FIG. 1 is a configuration diagram which shows a schematic configuration of a multi-function printer 20 according to an embodiment of the invention. FIG. 2 is a configuration diagram which shows a schematic configuration of a scanner unit 40.

The multi-function printer 20 according to the embodiment, as shown in FIG. 1, is formed of a housing 21, an openable and closable housing cover 22 at the top face of the housing 21, and includes a scanner unit 40 which optically reads out the original document and generates image data, a printer unit 42 which feeds and prints sheets which are set in a cassette 23 and discharges the sheets to a sheet discharge tray 24, an operation panel 46 with which a user is able to perform various operations, and a main controller 80 which is in charge of the overall control of the apparatus. On the top face of the housing 21, a flat bed portion 31 having a glass table 32 is arranged, and the original document which is placed on the glass table 32 can be optically read out using the scanner unit 40 (hereinafter, this operation mode is referred to as an original document fixing and reading mode). In addition, the housing cover 22 is embedded with an automatic document feeding unit 61 (hereinafter, referred to as an ADF unit), (refer to FIG. 2), the original document which is guided by an original document guide 29, and is set in an ADF insertion slot 26 is able to be optically read out in the scanning unit 40 while being continuously and automatically conveyed (hereinafter, this operation mode is referred to as an ADF reading mode).

The scanner unit 40 includes a scanner ASIC 50 and a scanner engine 60. The scanner ASIC 50 is an integrated circuit which controls the scanner engine 60, so that the scanner engine 60 is able to read out the original document as image data using any one of the original document fixing and reading mode and the ADF reading modem when receiving a scanning instruction from the main controller 80. In addition, the ASIC is an abbreviation of Application Specific Integrated Circuit.

As shown in FIG. 2, the scanner engine 60 includes, an ADF unit 61 which automatically conveys the original document which is set in the ADF insertion slot 26 to an ADF reading region 34; a light source unit 71 which irradiates the glass table 32 or the ADF reading region 34 with light; a compact image sensor (CIS) 74 which reads out the original document by receiving reflected light from the original document, and accumulating the reflected light as a charge; a CIS module 76 which is mounted with the light source unit 71 and the CIS 74; a carriage motor 78 which is fixed to the bottom of a housing of the CIS module 76, and moves along with the CIS module 76; a motor gear 78a which is rotatably driven by the carriage motor 78; and a guide gear 79 which is arranged in the sub-scanning direction. Here, the motor gear 78a and the guide gear 79 engage with each other, and a movement of the CIS module 76 is restricted in the sub-scanning direction where the guide gear 79 is arranged. That is, the CIS module 76 is configured so as to reciprocate in the sub-scanning direction along the guide gear 79 along with driving of the carriage motor 78. The carriage motor 78 is a stepping motor which moves the CIS module 76 line by line when performing reading out using the CIS module 76, and is operated along with a heat generation. The ADF unit 61 includes a pick-up roller 63 which is arranged in the vicinity of the ADF insertion slot 26, a plurality of conveying rollers 64 which are arranged at a conveying path 62, and a sheet discharge roller 65 which is arranged in the vicinity of an ADF sheet discharge tray 28. The ADF unit takes the original document which is set in the ADF insertion slot 26 sheet by sheet, and automatically conveys onto the conveying path 62 by rotatably driving each of the rollers 63, 64, and 65 using a conveying motor 66. The light source unit 71 has three colors of light sources of red LED 72R which lights red light, a green LED 72G which lights green light, and a blue LED 72B which lights blue light, and irradiates the glass table 32 or the ADF reading region 34 with light from the light source through a light guiding body 73. The CIS 74 is configured by a plurality of light receiving elements (CMOS image sensors) 75 of one line which are arranged in the main scanning direction, and generates color image data by reading out each one color of reflected light while sequentially exchanging lighting of each LED of 72R, 72G, and 72B.

The scanner ASIC 50 includes a read processing unit 51 which controls each device, an LED driving unit 54 which turns on and off the LEDs 72R, 72G, and 72B separately, an A/D conversion unit 56 which inputs an analog signal which is generated in the CIS 74 through an amplifier (not shown), and converts to a digital signal, and a motor driving unit 58 which drives the carriage motor 78 or a conveying motor 66 by receiving a control signal from the read processing unit 51. The read processing unit 51 includes a determination unit 52 and a control unit 53, and controls read processing of the original document, a read processing of the dark period measurement data which is read data in the dark period, or the like. The determination unit 52 determines whether a temperature in the carriage motor 78 is in a predetermined range, on the basis of the determination of whether or not the dark period measurement data is a pixel value in the range of the reference dark period to be described later, which is set corresponding to the temperature of the carriage motor 78. The control unit 53 outputs an instruction to the motor driving unit 58 on the basis of a determination result from the determination unit 52, and controls the driving of the carriage motor 78.

A white reference plate 36 is provided at the end of the glass table 32 in the sub-scanning direction. The white reference plate 36 is a plate for removing (shading compensation) uneven concentration which is generated in each pixel due to a deviation of light emission of the light source unit 71, a deviation in sensitivity behaviors for each pixel of the light receiving element 75, or the like. Here, black reference data is an output voltage which is obtained in the light receiving element 75 when scanning is performed by turning off all the LEDs 72R, 72G, and 72B, in a state where the carriage 76 is moved to a position which faces the white reference plate 36, before reading the original document. Alternatively, the white reference data is data which is obtained such that the black reference data is subtracted from an output voltage which is obtained in the light receiving element 75 when scanning is performed by turning on each LED 72R, 72G, and 72B under the original document reading condition which is currently set, in a similar state where the carriage 76 is moved to a position which faces the white reference plate 36.

The printer unit 42 includes a printer ASIC 44 and a printer engine 45. The printer ASIC 44 is an integrated circuit which controls the printer engine 45, and controls the printer engine 45 to print an image on recording paper on the basis of an image file as a target of print instruction when receiving the printing instruction from the main controller 80. The print engine 45 is configured as a well-known ink jet-type color printer mechanism which performs printing by ejecting ink to a sheet from a printing head. In addition, the printer unit 42 is not the point of the embodiment of the invention, and further detailed description will be omitted.

The operation panel 46 includes a display unit 47 which is arranged in the center thereof, and a power button 48 which is arranged on the left vicinity of the display unit 47. The display unit 47 is configured as a touch panel-type liquid crystal display, displays a mode button which selects a mode, a selection/setting button which selects a menu or an item by touching the button according to a guide which is displayed on the display, a start button which starts copying or printing, or the like, and accepts the touching operation. Here, as modes which are selectable by the mode selection button are for example, a copy mode which scans the original document which is placed on the glass table 32, and copies; a memory card mode which performs printing using an image which is recorded in a memory card MC installed in a memory card slot 49, or scans the original document, digitizes, and stores in the memory card MC; a film mode which scans a photographic film and prints the photographic film, or stores data in the memory card MC, or the like.

The main controller 80 is configured as a micro processor in which a CPU 82 is the main component, and includes the ROM 84 which stores various processing program, a variety of data, various tables, or the like, the RAM 86 which temporarily stores scanning data or printing data, and an internal communication interface 88 which is able to communicate with the operation panel 46. The main controller 80 inputs various operation signals or various detection signals from the printer unit 42 or the scanning unit 40, or inputs the operation signal which is generated according to the touching operation of the operation panel 46. In addition, the main controller reads out an image file from the memory card MC, outputs an instruction to the printer unit 42 so as to perform printing of image data, outputs an instruction to the scanning unit 40 so as to read out the original document as the image data, which is placed on the glass table 32 on the basis of the scanning instruction from the operation panel 46, or outputs a control instruction of the display unit 47 to the operation panel 46.

Figure 3:
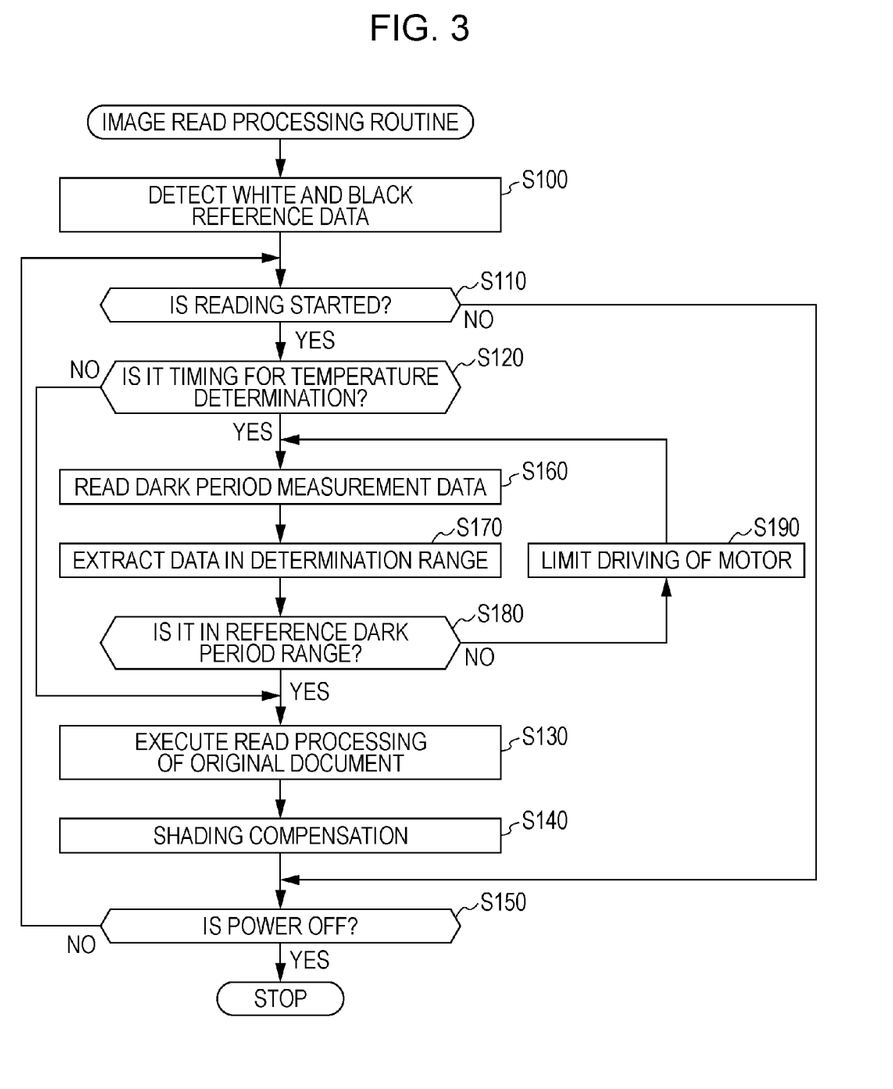
FIG. 3 is a flowchart which shows an example of a routine of image read processing.

Subsequently, an operation of the multi-function printer 20 according to the embodiment of the invention which is configured in this manner, particularly, the operation when performing scanning in the original document fixing and reading mode will be described. FIG. 3 is a flowchart which shows an example of an image read processing routine which is executed using the scanner ASIC 50. Here, a case will be mainly described in which a user continuously gives an instruction on reading a plurality of original documents, by repeating an operation of placing the original document on the glass table 32, and of pressing down a start button which is not shown, and is displayed on the operation panel 46. This processing is, for example, executed when the user presses down the power button 27, and the power is turned on.

When the image read processing routine is executed, the CPU 82 outputs an instruction to the scanner ASIC 50, and allows the scanner ASIC 50 to execute processing of detecting the white reference data and black reference data which are used in the shading compensation (Step S100). Here, when detecting the white reference data, the carriage motor 78 is controlled to be driven such that the carriage motor is moved to a position where the CIS module 76 faces the white reference plate 36, the white reference plate 36 is scanned by turning on all the LEDs of each color 72R, 72G, and 72B of the light source unit 71, and processing of storing an output voltage which is obtained in each light receiving element 75 by the number of pixels in the main scanning direction was performed. In addition, when detecting the black reference data, the white reference plate 36 is scanned by turning off all the LEDs of each color 72R, 72G, and 72B of the light source unit 71 at a position where the CIS module 76 and the white reference plate 36 face each other, and processing of storing the output voltage, which is obtained in each light receiving element 75 by the number of pixels in the main scanning direction, was performed. In the embodiment of the invention, for each reference data, data of a predetermined number of times is obtained by repeating the scanning by a predetermined number of times, and is set as a mean value of these.

When the white reference data and the black reference data are detected in this manner, the CPU 82 determines whether or not the instruction on the start of the reading operation has given by the user, on the basis of a determination of whether or not the start button (not shown) which is displayed on the operation panel 46 is pressed down (Step S110), and determines whether it is temperature determination timing or not, when the instruction on reading operation is given (Step S120). Here, the temperature determination timing is a timing where a predetermined number (for example, twice, three times, or the like) of instructions on performing reading is continuously given, after the power is turned on, that is, timing where an interval of each reading instruction is given in a predetermined time. The predetermined time may be, for example, 30 seconds, one minute, five minutes, or the like. When it is determined that it is not the temperature determination timing in Step S120, the CPU 82 outputs an instruction to the scanner ASIC 50, performs scanning the CIS module 76 as the reading unit, controls the CIS module 76 so as to read out the original document placed on the glass table 32, and executes read processing of the original document (Step S130). In the read processing of the original document, each LED 72R, 72G, and 72B emits light to the original document by being turned on, and obtains one line of image data by receiving the reflected light from the original document after the light emitting in the light receiving element 75, and stores the obtained output voltage by the number of pixels in the main scanning direction. In addition, the carriage motor 78 is driven so as to move the CIS module 76 by one line in the sub-scanning direction, and obtaining of the image data and movement in the sub-scanning direction are repeated, thereby obtaining the image data of the entire original document. Subsequently, the shading compensation processing is executed, in which unevenness of a concentration level is corrected for each pixel using the white reference data and the black reference data which are obtained in Step S100 (Step S140). When the shading compensation is finished in Step S140, or when it is determined that in Step S110, the reading instruction has not given, it is determined whether or not the power button 27 is pressed down by the user, and the power is turned off (Step S150). When the power is not turned off, processing from Step S110 is repeatedly performed.

Figure 4:
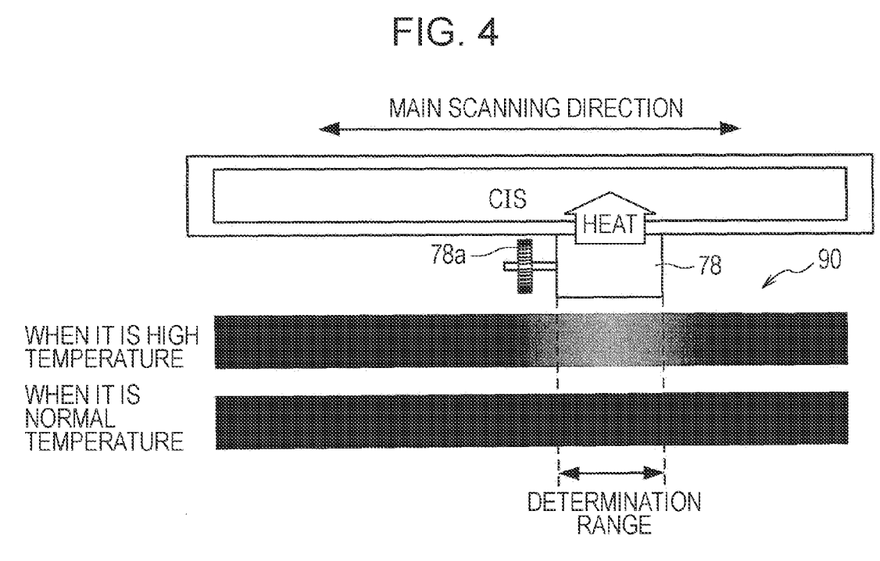
FIG. 4 is an explanatory diagram which shows an example of a determination range.
Figure 5:
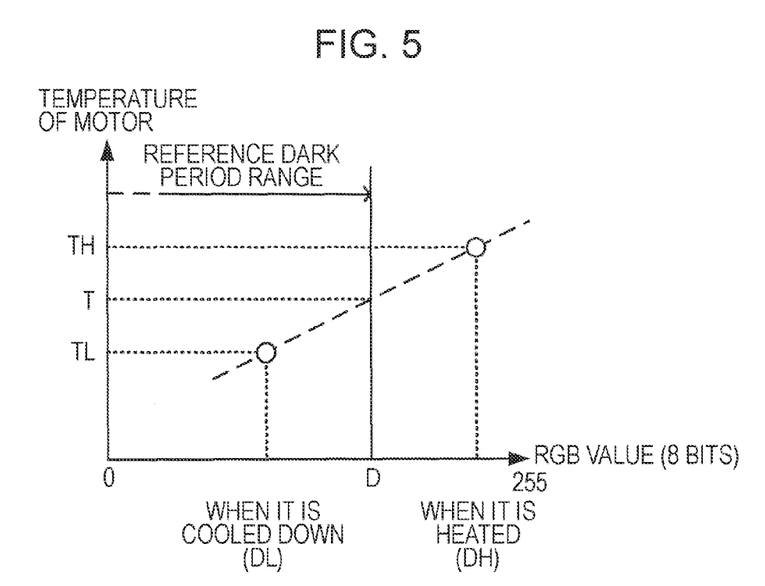
FIG. 5 is an explanatory diagram which shows an example of obtaining a range of reference dark period.

When it is determined that it is temperature determination timing in Step S120, the CPU 82 outputs an instruction to the scanner ASIC 50, controls the CIS module 76 as the reading unit, and performs read processing of the dark period measurement data (Step S160). In the read processing of the dark period measurement data, similarly to the above described detection of the black reference data, the white reference plate 36 is scanned by turning off all the LEDs of each color 72R, 72G, and 72B of the light source unit 71, further obtains the mean value of the RGB values (hereinafter, referred to as a pixel value), thereby determining this value as the dark period measurement data. In addition, the dark period measurement data according to the embodiment is obtained such that a predetermined number of scanning is repeatedly performed to obtain data of a predetermined number of times. In this manner, data in the determination range is extracted from the dark period measurement data which is read out (Step S170). FIG. 4 is an explanatory diagram which shows an example of a determination range. FIG. 4 shows diagrams of an image of dark period measurement data 90 which are read out at the time of a high temperature and a normal temperature. As shown in FIG. 4, the image obtained in a state where the heat is applied to the CIS 74 moves to a white side in a range where it is influenced by the heat. For example, when it is expressed as RGB values (0 to 255) of 8 bits, the entirety thereof is black (for example, the RGB values are 10 to 20), when the temperature is normal such as 25° C. On the contrary, when the temperature is high such as 100° C., the image moves to the white side in a range where it is influenced by the heat (for example, the RGB values are 30 to 40). Here, the determination range is a range of the CIS module 76 to which the carriage motor 78 is provided. In the range where the carriage motor 78 is provided, particularly the CIS module 76 is easily influenced by the heat, and if the determination is made using data which is obtained from such a range which is easily influenced by the heat, it is possible to effectively make the determination. In addition, the determination range is stored in a determination unit corresponding to a predetermined light receiving element. Subsequently, it is determined whether or not the dark period measurement data of the determination range is in the range of the reference dark period (Step S180). Here, the dark period measurement range is stored in the determination unit 52 as a number range. In this manner, when the CIS 74 or the like is exposed to the heat, the temperature of the carriage motor 78 is assumed on the basis of the dark period measurement data which is read out in the CIS module 76, using a property of the black image which further moves to the white side than usual. FIG. 5 is an explanatory diagram which shows an example of a method of obtaining the range of the reference dark period. By obtaining the relationship between the temperature of the carriage motor 78 and the pixel value obtained at the time by an experiment or the like, whereby the range of the reference dark period is set as a range of a pixel value which corresponds to the temperature range of the carriage motor 78 when a good reading quality is obtained. Here, the relationship between the temperature T (° C.) of the carriage motor 78 and the pixel value D is obtained by measuring a pixel value DL of an image when the temperature of the carriage motor 78 is TL° C. and a pixel value DH of an image which is read out when the temperature of the carriage motor 78 is TH° C. which is higher than TL° C., and by obtaining linear approximation from these values. In this case, it is possible to obtain T and D using the following expression (1). In addition, here, TL and TH are directly measured by allowing the thermosensor to come into contact with the carriage motor 78.

$$T = ((TH-TL)/(DH-DL))D + (DH \cdot TL - DL \cdot TH)/(DH-DL) \qquad (1)$$

When it is determined that the carriage motor 78 is in the range of the reference dark period in Step S180, the read processing of the original document from Step S130 is performed by assuming that the temperature of the carriage motor 78 is not high. On the other hand, when it is determined that the carriage motor 78 is not in the range of the reference dark period in Step S180, driving of the carriage motor 78 is limited by assuming that the temperature of the carriage motor 78 is high (Step S190). In addition, the processing of Step S160 to Step S180 are repeated, and the limitation of driving is continued until it is determined that the carriage motor 78 is in the range of the reference dark period in Step S180. Here, the limitation of driving of the carriage motor 78 is performed by stopping supply of power to the carriage motor 78. When it is determined that the carriage motor 78 is in the range of the reference dark period in Step S180, the read processing of the original document from Step S130 is performed, as described above. In addition, when it is determined that the power is turned off in Step S150, this routine is finished.

Here, the correlation between the constituent element of the embodiment and the constituent element of the invention will be clarified. The light source unit 71 according to the embodiment corresponds to the light emitting unit of the invention, the CIS 74 corresponds to the light receiving unit of the invention, the CIS module 76 corresponds to the reading unit, the carriage motor 78 corresponds to the operation unit, the CPU 82 and the determination unit 52 correspond to the determination unit, and the CPU 82 and the control unit 53 correspond to the control unit. In addition, in the embodiment, an example of the control method of the invention is clarified by describing the operation of the image reading apparatus.

In the above described multi-function printer 20 according to the embodiment, when the dark period measurement data is in the range of the reference dark period, the read processing of the original document is performed by assuming that the temperature of the carriage motor 78 is not high, and when the dark period measurement data is not in the range of the reference dark period, the operation of the carriage motor 78 is limited by assuming that the temperature of the carriage motor 78 is high. In this manner, since the temperature of the carriage motor 78 is assumed on the basis of the dark period measurement data which is the read image data, it is possible to further appropriately limit the operation of the carriage motor 78. In addition, when the dark period measurement data is in the range of the reference dark period, since the operation limitation is released, and the processing rapidly moves to the read processing of the original document, it is possible to further appropriately limit the operation. In addition, since the operation of the carriage motor 78 is further appropriately limited, it is possible to effectively perform the read processing without decreasing the read quality. Further, since the temperature of the carriage motor 78 is assumed by using the CIS module 76 which reads out the original document, and by using the dark period measurement data which is image data obtained in this manner, it is possible to limit the operation of the operation unit further easily with current constituent components, without using a new component such as a temperature sensor.

In addition, since it is possible to further appropriately limit the operation of the carriage motor 78 of which calorific value is apt to increase, the influence of the heat on the CIS module 76 can be effectively suppressed. Particularly, since the carriage motor 78 is moved along with the CIS module 76 by being fixed to the housing of the CIS module 76, the carriage motor of smaller size and high output is desired, accordingly, the calorific value of the motor is apt to increase. Further, since the determination unit 52 determines whether or not the dark period measurement data of the determination range in which the carriage motor 78 is installed is in the predetermined range of the reference dark period, it is possible to reduce the information amount used in the determination, and to effectively make the determination.

In addition, since the CIS module 76 is configured to reciprocate in the sub-scanning direction along the guide gear 79 along with the driving of the carriage motor 78, the configuration thereof can be simplified in comparison to a configuration in which a carriage belt, which is installed between a driving motor attached to one end of a housing of a scanner unit and a driven roller which is attached to the other end of the housing, is driven by a driving motor, and moves in the carriage movement direction (sub-scanning direction). In addition, since the carriage motor 78 is fixed to the bottom of the housing of the CIS module 76, space saving is possible.

In addition, it is needless to say that the invention is not limited by any of the above described embodiments, and can be variously embodied as long as it belongs to the technical range of the invention.

In the above described embodiments, a case of the original document fixing and reading mode was described, however, it can be applied to a case of an ADF reading mode. In the ADF reading mode, the carriage motor 78 does not move, however, there may be a case where power is continuously supplied in order to fix the CIS module 76 to the ADF reading region 34. In such a case, it is possible to limit the operation by stopping or limiting the supply of the power. In addition, in the above described embodiments, the ADF unit 61 was set to a type which reads out the original document using the ADF reading region 34, however, it may be a type which moves the original document onto the glass table 32. In this case, it is possible to perform the driving limitation of the carriage motor 78 similarly to the case of the original document fixing and reading mode.

For example, in the above described embodiments, the temperature of the carriage motor 78 was assumed, however, it is not particularly limited, if it is one which assumes the temperature of a component which operates along with heating when reading out using CIS module 76. For example, it may assume the temperature of the conveying motor 66 which operates along with heat when reading out in the ADF reading mode. In this manner, it is possible to further appropriately limit the operation, as well.

In the above described embodiments, the carriage motor 78 was to be fixed to the housing of the CIS module 76, however, the carriage motor may be fixed to the CIS module 76 directly or indirectly. In this manner, it is also possible to further appropriately limit the operation of the CIS module 76. In addition, the carriage motor 78 was to be a stepping motor, however, it is not particularly limited thereto.

In the above described embodiments, the driving limitation of the carriage motor 78 was to be performed by stopping power supply to the carriage motor 78, however, the limitation may be performed by reducing the supply amount of the power. As methods of reducing the power supply, the rotation speed of the carriage motor 78 may be reduced, or the carriage motor may be stopped so as not to rotate. By reducing the power supply in this manner, it is possible to reduce the calorific value of the carriage motor 78. In addition, these driving limitations may be combined, may be changed to multi-stage, or non-stage, according to the value of the dark period measurement data. Further, processing for cooling the carriage motor 78 together with the driving limitation of the carriage motor 78 may be performed. In addition, the driving limitation of the carriage motor 78 was to be continued until the temperature of the carriage motor 78 is determined to be in the range of the reference dark period in Step S180, however, it may wait in a state where the driving limitation is continued until a predetermined cooling time has passed. In this case, when a predetermined cooling time has passed, it is assumed that the temperature of the carriage motor 78 is not high, and following processing may be performed. In this manner, it is possible to suppress the number of times of read and determination, and to effectively limit the operation. Such a driving limitation time may be a time which is experimentally obtained on the basis of the temperature of the carriage motor 78, and the type of the driving limitation. In addition, every time a predetermined cooling time passes, the processes of Step S160 to Step S180 are performed to determine the temperature of the carriage motor 78, and the driving limitation may be continued until the temperature of the carriage motor 78 is determined to be in the range of the reference dark period in Step S180. The predetermined cooling time may be a time which is experimentally obtained on the basis of the temperature of the carriage motor 78, and the type of the driving limitation. It is possible to further appropriately limit the operation by adopting these various methods.

In the above described embodiments, the read processing of the original document was not to be performed while limiting the operation of the carriage motor 78, however, the read processing of the original document may be performed. For example, the read processing of the original document may be performed along with the driving limitation of the carriage motor 78. In this manner, it is possible to further effectively perform the read processing of the original document, since the read processing of the original document can be performed during the driving limitation.

In the above described embodiments, the temperature determination timing was timing when there is a predetermined number of reading instructions (for example, twice or three times) after the power is turned on, and when an interval of each reading instruction was given in a predetermined time, however, it is not particularly limited to this. For example, a time when there is a reading instruction may be temperature determination timing for every time, and it may be a time when there is a reading instruction of predetermined times or more in a predetermined time. In addition, the reading of the dark period measurement data was performed at the position of the white reference plate, however, it is not particularly limited, if light does not enter when reading the dark period measurement data. For example, the reading of the dark period measurement data may be performed at the reading position.

In the above described embodiments, data in the determination range which is the range of the CIS 74 to which the carriage motor 78 is provided was extracted from the dark period measurement data, and it was determined that whether or not the data is in the range of the reference dark period, however, data in the determination range may not be extracted. In addition, the determination range may not be the range where the carriage motor 78 is provided, for example, it may be the entire main scanning direction, may be a range which is separated from the range where the carriage motor 78 is provided by a predetermined distance, or the like.

In the above described embodiments, the reference dark period range or the dark period measurement data are set as a mean value of a pixel value (RGB value), however, it is not limited to this. For example, it may be an electric signal which is obtained from each element 75 such as an amount of charge or a voltage. In this manner, it is possible to reduce processing from the reading to the determination. In addition, it may be a temperature which is assumed from the pixel value.

The reference dark period range may be set randomly, however, it may be set before the shipment of the product in the factory, may be set by a user, and may be set by a service technician when getting a periodic check, or the like. In addition, the reference dark period range was set almost linearly, however, a variety of approximation may be used without being limited to this. In addition, two points measured the relationship between the temperature and the pixel value, however, the number of points may be increased. In this manner, it is possible to perform more accurate approximation. In addition, the range of the reference dark period has the determination unit 52 as the number range, however, it is not limited to this. For example, by assuming that the determination unit 52 has an approximation formula, it is possible to determine whether it is in the range of the reference dark period or not by using the approximation formula. In addition, when setting the range of the reference dark period, the temperature was to be directly measured by allowing the thermo sensor to come into contact with the carriage motor 78, however, it is not limited to this. For example, a temperature when the carriage motor 78 is driven under a predetermined condition for a predetermined time is experimentally obtained, and a pixel value at the time of driving the carriage motor 78 under the condition, or the like, may be read out at the initial startup or the like.

In the above described embodiments, the shading compensation was performed, however, it may not be performed.

In the above described embodiments, the multi-function printer 20 was described, however, for example, it may be a scanner unit, and may be a facsimile which has a function of a fax. In addition, the printer unit 42 was set to an ink jet-type color printer unit, however, it is not particularly limited to this, and may be an electrophotgraphy-type color printer, may be a dot impact-type color printer, or may be a monochrome printer of these.

In the above described embodiments, the multi-function printer 20 was described, however, it may be a control method, or a program which executes this method.

What is claimed is:

1. An image reading apparatus comprising:
    a reading unit which reads out an original document, and includes a light emitting unit which emits light to the original document, and a light receiving unit which has a light receiving element that receives reflected light of the light which is reflected on the original document;
    an operation unit which is provided in the vicinity of the reading unit, and operates by being heated when reading the original document using the reading unit;
    a determination unit which determines whether a temperature heated by the operation unit is in a predetermined range based at least on a dark period measurement data, wherein the dark period measurement data is read out using the reading unit when the light emitting unit is turned off; and
    a control unit which controls the reading unit and the operation unit so that read processing which reads out the original document is to be performed when the temperature heated by the operation unit is determined to be in the predetermined range, and reduces the operation of the operation unit in comparison to the read processing when the temperature heated by the operation unit is determined not to be in the predetermined range.

2. The image reading apparatus according to claim 1,
    wherein the operation unit is a driving unit which is driven when the original document and the reading unit are relatively moved.

3. The image reading apparatus according to claim 1,
    wherein the operation unit is a driving unit which is fixed to the reading unit which reads out the original document while moving, and moves along with the reading unit.

4. The image reading apparatus according to claim 1, wherein the determination unit determines whether or not the temperature heated by the operation unit is in the predetermined range based at least on the dark period measurement data corresponding to a predefined portion of the reading unit, wherein the predefined portion of the reading unit corresponds to a portion of the reading unit which is in the vicinity of the operation unit.

5. The image reading apparatus according to claim 1, wherein the determination unit repeats the reading out of the dark period measurement data using the reading unit, and the determination of whether or not the temperature heated by the operation unit is determined to be in the predetermined range, and
wherein the control unit is the unit which reduces the operation of the operation unit until the temperature heated by the operation unit is determined to be in the predetermined range.

6. The image reading apparatus according to claim 1, wherein the control unit reduces the operation of the operation unit until a predetermined cooling time passes.

7. The image reading apparatus according to claim 1, wherein the determination unit determines whether the temperature heated by the operation unit is in the predetermined range by comparing the dark period measurement data with a predetermined range of reference dark period.

8. A control method of an image reading apparatus including a reading unit which reads out the original document, and includes a light emitting unit which emits light to the original document, and a light receiving unit which has a light receiving element that receives reflected light of the light which is reflected on the original document; and
an operation unit which is provided in the vicinity of the reading unit, and operates by being heated when reading the original document using the reading unit,
the control method comprising:
(a) determining whether a temperature heated by the operation unit is in a predetermined range based at least on a dark period measurement data, wherein the dark period measurement data is read out using the reading unit when the light emitting unit is turned off; and
(b) controlling the reading unit and the operation unit so that read processing which reads out the original document is to be performed when the temperature heated by the operation unit is determined to be in the predetermined range, and reduces the operation of the operation unit in comparison to the read processing, when the temperature heated by the operation unit is determined not to be in the predetermined range.

9. A non-transitory computer-readable recording medium embodying a program, which when executed by a computer, performs the control method of the image reading apparatus according to claim 8.

* * * * *